(12) United States Patent
Berger et al.

(10) Patent No.: US 6,507,734 B1
(45) Date of Patent: Jan. 14, 2003

(54) METHOD AND SYSTEM WHICH USES SOUND WAVE BASED COMMUNICATION TO GENERATE A SECURE WIRELESS LINK BETWEEN A HANDSET AND BASE STATION

(75) Inventors: Doug M. Berger, Las Flores, CA (US); Norman J. Beamish, Costa Mesa, CA (US); Xiaohua "Joseph" Xie, Irvine, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 0 days.

(21) Appl. No.: 09/216,086

(22) Filed: Dec. 18, 1998

(51) Int. Cl.⁷ ................................................. H04M 1/66
(52) U.S. Cl. ........................ 455/410; 455/41; 455/418; 455/550; 379/56.1
(58) Field of Search ................................. 455/410, 411, 455/575, 561, 550, 418, 41; 379/56.1

(56) References Cited

U.S. PATENT DOCUMENTS

| | | | |
|---|---|---|---|
| 4,736,404 A | 4/1988 | Anglikowski et al. | |
| 4,864,599 A | 9/1989 | Saegusa et al. | |
| 5,228,026 A | 7/1993 | Albrow et al. | |
| 5,307,370 A | 4/1994 | Eness | |
| 5,448,764 A | 9/1995 | Sondermann et al. | |
| 5,500,888 A | * 3/1996 | Chiu et al. | 455/410 |
| 5,564,074 A | 10/1996 | Juntti | |
| 5,581,598 A | 12/1996 | Hachiga | |
| 5,689,549 A | * 11/1997 | Bertocci et al. | 455/550 |

* cited by examiner

*Primary Examiner*—Doris H. To
(74) *Attorney, Agent, or Firm*—Knobbe, Martens, Olson & Bear LLP

(57) ABSTRACT

Methods and apparatus for establishing secure wireless links between a handset and a base station in cordless telephone systems are described. A method of generating a secure wireless link between a handset and a base station includes initiating a linking procedure, generating a security code, trasmitting the security code from a sound transmitter, receiving the security code at a sound receiver and then establishing a radio frequency link between the handset and the base station utilizing the security code. A cordless telephone system capable of generating a secure wireless link includes both a handset and a base station. The handset includes a control circuit, an rf transmitter and an rf receiver coupled to the control circuit along with a sound receiver also coupled to the control circuit. The base station includes a control circuit, a code generation circuit coupled to the control circuit, a sound transmitter coupled to the control circuit for transmitting a code generated by the code generation circuit, and an rf transmitter and an rf receiver coupled to the control circuit.

9 Claims, 4 Drawing Sheets

METHOD AND SYSTEM WHICH USES SOUND WAVE BASED COMMUNICATION TO GENERATE A SECURE WIRELESS LINK BETWEEN A HANDSET AND BASE STATION

BACKGROUND OF THE INVENTION

1. Field of the Invention

This invention relates generally to wireless communication systems that includes security arrangements for preventing any unauthorized use and has particular applicability to cordless telephone systems.

2. Description of the Related Art

The cordless telephone has become a popular consumer good. The cordless telephone allows a user to untether herself from a wired connection to her local telephone line. Typically a cordless telephone is comprised of two units: a base unit and a handset, both of which are radio frequency ("rf") transceivers. The base unit connects to the public switched telephone network, typically using a standard RJ-11 connector. The base unit provides a wireless connection or a wireless communication link through the handset. The handset is capable of receiving and transmitting signals over a wireless link to the base unit. The base unit typically includes an antenna, a transmitter and a receiver. The handset typically includes a speaker, a microphone, an antenna, a transmitter and a receiver.

In operation, to place a telephone call from a cordless telephone handset, the handset is enabled causing a control signal to be generated at the handset and transmitted to the base unit. The base unit receives and detects the control signal and in response thereto seizes the telephone line. Dialing signals and audio signals from the handset are transmitted (using various known transmission schemes and formats) to the base unit which then transmits them over the telephone line. The base unit receives audio information over the telephone line and then transmits that information to the handset.

With the ever increasing use of cordless telephones and the limited frequency band available for transmission between handsets and base stations, many users are assigned the same frequencies for transmitting and receiving. People cognizant of this fact have used handsets to place unauthorized telephone calls through the base stations of other users. With the range of communication between a base unit and a handset typically extending at least a few hundred feet, it is quite feasible that a person may travel around slowly in an automobile with a handset unit turned on until she receives a dial tone and then places a call over another person's telephone lines.

In order to prevent the placing of unauthorized telephone calls, various systems have been developed to attempt to ensure that unauthorized telephone calls are not placed. One such system involves a control code that is determined by switches manually preset in both the handset and the base unit. Only after receipt of a signal with this control code from the handset and the favorable comparison thereof with the control code set at the base unit, does the base unit allow the telephone line to be seized to place the call from the handset. The possibility of mismatching the switch settings in the handset and the base unit is high, however, and the number of switches is therefore usually kept to a small number. Unfortunately this increases the opportunity for an unauthorized user to correctly determine the control code. Additionally, varying the switch setting between units during production increases production costs.

Some cordless telephone systems are designed to operate such that the handset and base station never come into physical contact. However, to achieve a secure wireless link, both the handset and the base unit need to know the same control or security code. If the system is designed such that this same security code is used by all base units in production, then unauthorized users can easily communicate with a base station and make unauthorized calls. Again, programming a unique security code into each handset and base unit pair at the factory can add significantly to production costs. It also precludes multi-handset unit systems and precludes the use of additional handsets with the base station.

In another security system for use with cordless telephones, the radio frequency link between the base unit and the handset is used to set the security code. Sometimes this is done at a lower power transmission to help reduce the chance of an unauthorized user receiving this "set up" transmission. However, even in the lowest available power setting, most base units still transmit in a range that far exceeds the buildings in which they are used and thereby potentially allows unauthorized users to intercept this communication.

In still another security system for use with cordless telephones, to prevent an unauthorized handset from obtaining dial tone from a base unit, a predetermined security code stored in the base unit is transferred to the handset while the handset is located in a mating cradle in the base unit. The battery that allows for operation of the handset while remote from the base unit is normally charged when the handset is placed in this mating cradle. The direct current charging path established for charging of the battery also includes transfer circuits in the base unit and the handset to respectively transmit and receive the security code. Such a system is described in U.S. Pat. No. 4,736,404, issued Apr. 5, 1988.

SUMMARY OF THE INVENTION

All of the foregoing described systems have addressed the problem of preventing unauthorized users from obtaining a dial tone and placing a call through another base unit. Another problem exists in the area of cordless telephones, and that is the problem of eavesdropping on the transmission between the base unit and the handset. Therefore, it would also be desirable to have the radio frequency transmissions between the base unit and handset be made more secure.

The invention is generally directed to methods and apparatus for establishing secure wireless links between a handset and a base station. One embodiment of the invention finds particular application to cordless telephone systems.

One aspect of the invention encompasses a method of generating a secure wireless link between a handset and a base station. The method includes initiating a linking procedure, generating a security code, transmitting sound based on the security code at the base station, receiving the sound at the handset, and then establishing a radio frequency link between the handset and the base station utilizing the security code.

In another aspect of the invention, a cordless telephone system capable of generating a secure wireless link includes both a handset and a base station. The handset includes a control circuit, a sound receiver, an rf transmitter, an rf receiver and a keypad, all coupled to the control circuit. The base station includes a control circuit, a code generation circuit coupled to the control circuit, a sound transmitter coupled to the control circuit for transmitting a code generated by the code generation circuit, and an rf transmitter and receiver coupled to the control circuit.

In a further aspect of the invention, the code generation circuit includes a pseudo random number generator.

BRIEF DESCRIPTION OF THE DRAWINGS

The features and advantages of the invention will become more apparent from the detailed description set forth below when taken in conjunction with the drawings wherein like parts are identified with like reference numerals throughout and wherein.

DETAILED DESCRIPTION OF THE PREFERRED EMBODIMENT

In a cordless telephone system where the base unit and handset need to have or "know" the same security code, it is desirable to be able to communicate a selected security code from the base unit to the handset, or vice versa, in a secure manner. This ability can be useful, for example, when a new handset and base unit are first put into service, when a handset is replaced with a new unit, and when additional handsets are added to operate with an existing base unit. The security code can be utilized to prevent unauthorized handsets from utilizing the telephone connection of the base unit, as part of an encoding scheme for encoding transmissions between the handset and the base unit to eliminate eavesdropping, or as the first step in a two or more stage process wherein the security code is used to verify an initial link between a handset and a base unit with subsequent communication over the initial link utilized to transmit a more secure and complex code and/or security arrangement between the two units.

In an embodiment of the invention, during system initialization, such as when the base unit is first installed, or when a new handset is to be initialized with an existing base unit, the base unit and handset first exchange a security code. The security code is exchanged in a manner which minimizes the possibility of it being received or intercepted by a third party. Specific methods and apparatus for accomplishing this exchange are described below in more detail. After the security code has been exchanged, it is used by the base unit to verify communications received from the handset. That verification method can be a simple password, but it also can be used as an encryption key for the actual information transmitted between the handset and base unit, thereby making it much more difficult for eavesdroppers to obtain any useful information.

As a further part of the initial set up operation, after the base unit and handset have exchanged a security code, they can then use this initial secure level of communications based upon the security code to exchange much more elaborate security codes and/or communication protocols. For example, the initial security code could be a simple alpha numeric code which is used as both a password and encryption key. Further set up information could then be exchanged to establish more elaborate security precautions over the communication link using the password and encryption. For example, more complex security codes could be exchanged, frequency hopping patterns and durations could be exchanged, and other security arrangements could be transmitted between the handset and base unit as are known to those of ordinary skill in the art.

Figure 1:
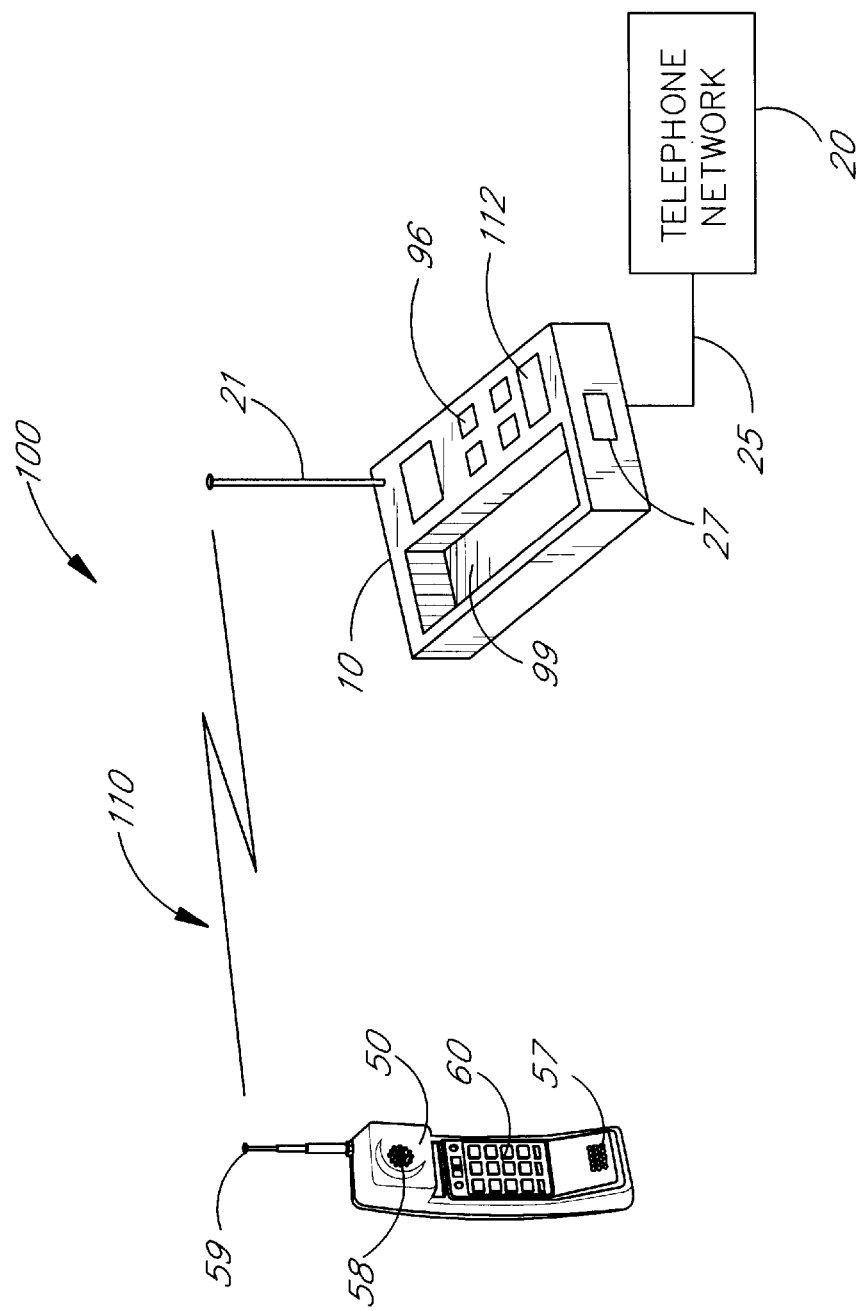
FIG. 1 is an exemplary cordless telephone system in accordance with aspects of the present invention.

FIG. 1 illustrates a cordless telephone system generally indicated as 100 which incorporates the present invention. The cordless telephone system 100 includes a handset unit 50 and a base unit 10. The handset 50 and the base unit 10 communicate via a radio frequency communication ("rf") link 110.

The base unit 10 is typically connected through a hard wire connection 25 to the public switched telephone network 20. Base unit 10 includes an antenna 29 for transmitting and receiving rf signals. A sound transmitter 27 such as a speaker, is included in the base unit. The base unit also includes an initialization button 96 and can include other buttons or contact switches to allow a user to interact with the device. A cradle 99 in the base unit is configured to receive the headset 50.

The handset 50 includes an antenna 59 for transmitting and receiving rf signals. The handset 50 further includes a sound transmitter 58 such as a speaker and a sound receiver 57 such as a microphone. Typically, the handset 50 includes a key pad 60 of the type typically included on telephones for inputting information into the handset 50 and a display 63 for transmitting information to the user. Typically, the hand set 50 is configured to rest in the cradle 99 of the base unit 10 when the hand set 50 is not in use. However, in some cordless telephone systems, particularly those in which the base unit is installed in a remote or not easily accessible location, cradle 99 is not included.

Figure 2:
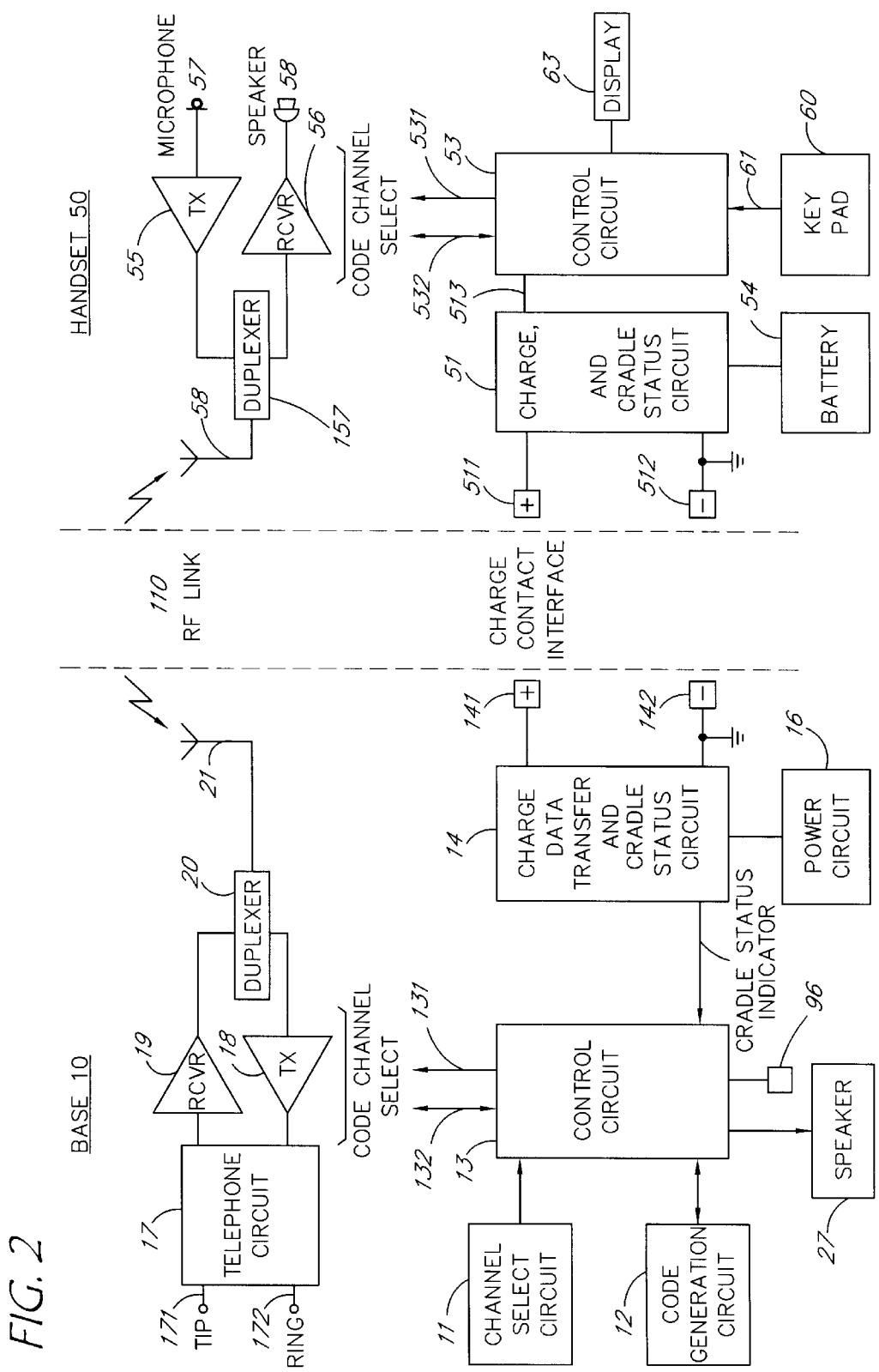
FIG. 2 is a block diagram of handset and base unit according to the present invention.

FIG. 2 is a functional block diagram representation of a cordless telephone system in accordance with principles of the invention. However, the use of the invention is not limited to any specific cordless telephone system and is applicable to the various cordless telephone systems known to those of skill in the art.

As shown in FIG. 2, the cordless telephone system generally includes a base unit 10 and a handset 50. Included in the base unit 10 is a channel select circuit 11 and a code generation circuit 12. The channel select and code generation circuits can be implemented as a non-volatile memory. As will be apparent to those skilled in the art, the channel select and code generation circuits could alternatively be implemented in the handset unit 50.

The code generation Circuit 12 can alternatively be implemented as a random or pseudo random number generator. The random number can be generated when the base station is powered up for the first time or when put into a code generation mode by the user.

The control circuit 13 is coupled to both the channel select circuit 11 and the code generation circuit 12. The control circuit 13 processes the appropriate channel selection and appropriate security code data selected for use in the base unit 10. The control circuit can be implemented through the use of a micro processor.

The base unit 10 also includes a telephone circuit 17 that connects an rf transmitter 18 and an rf receiver 19 to a central telephone office through TIP and ring lines 171 and 172 respectively. The transmitter 18 and the receiver 19 respectively transmit to and receive rf signals from the handset 50 with the control circuit 13 providing the appropriate frequency channel information for this communication over control line 131. The receive and transmit signals of the base unit 10 are coupled to a duplexer 20 which permits the transmitter 18 and receiver 19 to both operate through antenna 21 while stopping the output power of transmitter 18 from being coupled directly into the input of the receiver 19.

A charge and cradle status circuit 14 is also connected to the control circuit 13. This circuit provides a charging path for charging a battery 54 in the handset unit 50 through a charge contact interface, including contacts 141, 142, 511 and 512 from a power circuit 116 and it monitors cradle status circuitry to determine when a handset is in the cradle.

The speaker (sound transmitter) 27 is connected to the control circuit 13. The speaker is capable of transmitting the security code generated by the code generation circuit 12 to the handset within a limited range.

Contained in the handset unit 50 is a charge circuit 51 which provides a charging path through the power circuit 16 to charge the battery 54 by the charge contact interface. A control circuit 53 in the handset unit 50 interfaces with the circuit 51 over line 513.

The control circuit 53 can be implemented by a microprocessor. The control circuit 53 also communicates with a key pad 60 via line 61 for receiving user input. Special function keys can be included to begin the initiation sequence described below. The control circuit 53 includes a memory located therein for storing, for example, the received security code. A microphone 57 and a speaker 58 provide audio input and output for the rf transmitter 55 and rf receiver 56, respectively. The rf output of the transmitter 55 and input from receiver 56 are coupled to an antenna 59 through a duplexer 157. The microphone 57 also functions to receive transmissions from the speaker 27 of base unit 10. Alternatively, a separate microphone can be included in the handset for that purpose.

During normal operation, the base unit 10 and the handset 50 communicate via the rf link 110. Prior to establishing the rf link 110, both the base unit 10 and handset 50 need to be operating under the same communication and security protocols.

Figure 3:
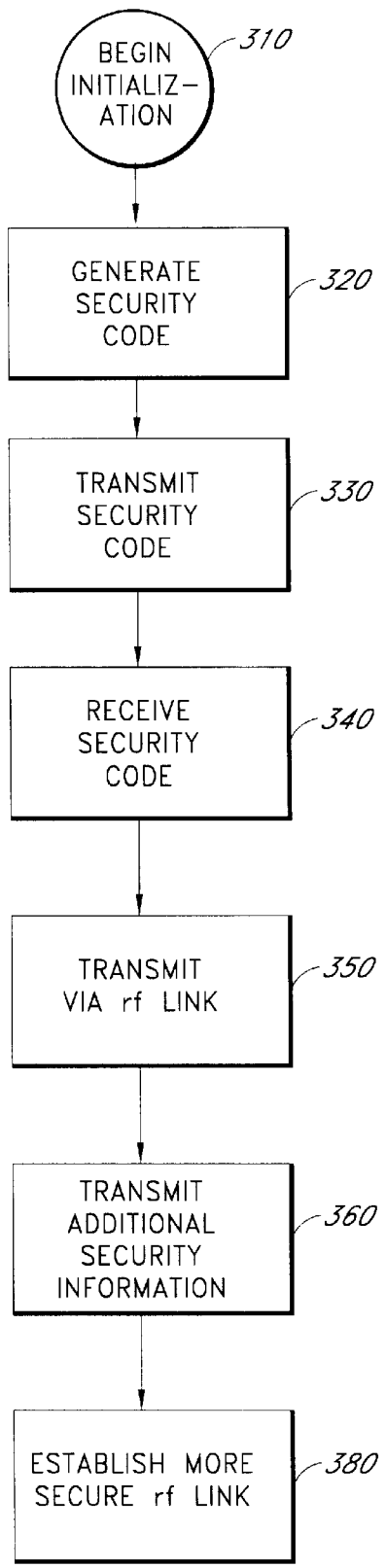
FIG. 3 is a flow diagram of a process for establishing a secure wireless link.

Referring now to FIG. 3, a method of operation of the invention with reference to the block diagram of FIG. 2 will be provided. Though the following description has the base unit 10 begin the initialization, the method can also be implemented with the base unit and handset switching roles.

In block 310, the initialization sequence is begun. When the cordless telephone system is first installed, or when a new handset is to be used with the base unit, the initialization sequence is carried out. The initialization sequence can be started by the user interacting with the base unit, such as pressing the initialization button 96 (see FIG. 2) or a series of buttons on the base unit. Alternatively, the initialization sequence can begin automatically upon power up of the base unit. The initialization sequence depicted in FIG. 3 can be controlled through software or firmware running on the control circuit 13 of the base unit 10.

In block 320 the code generation circuit 12 generates a security code. As was discussed above, the security code can be generated using a table stored in non-volatile memory or a pseudo random generator. In block 330 the security code is transmitted via the speaker 27 of the base unit.

The security code can be transmitted via the speaker 27 in any appropriate sound format. For example, the transmission can take the form of DTMF tones, amplitude modulation, pulse width modulation, pulse position modulation or the like.

At block 340 the transmitted security code is received by the microphone 57 of the handset. As with the base unit, the handset can be placed in an initialization mode directly upon first powering on the unit, or, alternatively, by pressing an initialization button, or other suitable method. The handset then operates or carries out a series of instructions utilizing the control circuit 53 under the control of a software or firmware program as described below.

In block 350 the handset transmits a signal over the rf link to the base unit utilizing the security code. For this initial establishment of the rf link, the security code can be used as part of the hand shake protocol and/or as an encoding key.

In block 360, in response to the transmission from the handset, the base unit 10 transmits additional security information to the handset 50 via the rf link, also utilizing the security code as part of a hand shake routine and/or as an encoding key. In block 380 both the base unit and the handset utilize the additionally transmitted security information to establish a more secure rf communication link between the two. The additional security information can include a more complex security code, hopping patterns and durations and other security arrangements.

As was indicated above, the invention can be implemented with the base unit and the handset essentially reversing roles. In that embodiment, the security code generating circuit is located in the handset. A microphone or other suitable audio receiver is located on the base unit for receiving the security code transmitted by the speaker in the handset.

Figure 4:
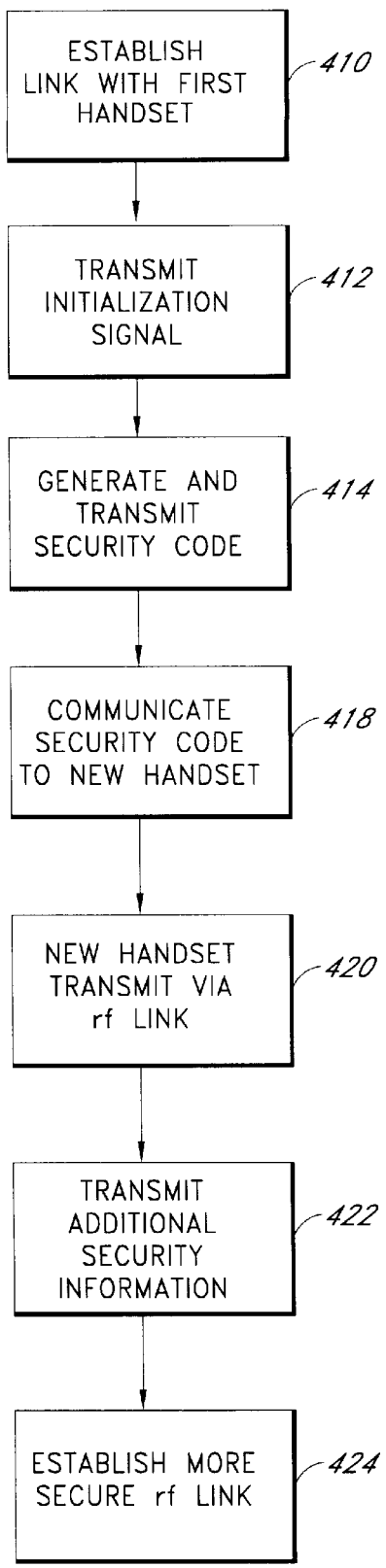
FIG. 4 is a flow diagram of a process for establishing a secure wireless link for a second handset.

When the base unit is to be installed at a location that is not easily accessible, an alternative embodiment of the invention may be advantageously employed as will be described with reference to FIG. 4.

In block 410, a secure RF link is established between the base unit 10 and a first handset 50. The establishment of this secure RF link can be accomplished as was described above with reference to FIG. 3. In addition, this RF link is preferably established prior to installation of the base unit in the inaccessible location.

In block 412, in response to user input such as the pressing of an initialization button or the entering of a predetermined sequence of keys on the keypad 60, the first handset 50 transmits an initialization signal to the base station 10. This approach is particularly advantageous when the base station has been installed in an inaccessible location.

In block 414, in response to the initialization signal, the base station 10 generates a security code utilizing the code generation circuit. The base station 10 then transmits the security code via the speaker 27 to the handset which is being added to the system (the second handset).

In block 418 the second handset receives the security via its microphone. In block 420, the second handset transmits a signal over the RF link to the base station utilizing the security code. For this initial establishment of the RF link, for example, the security code can be used as part of the handshake protocol and/or as an encoding key.

In block 422, in response to the transmission from the second handset, the base unit 10 can transmit additional security information to the handset via the RF link, also utilizing the security code as part of a handshake routine and/or as an encoding key.

In block 424, both the base unit and the second handset utilize the additionally transmitted security information to establish a more secure RF communications link between the two. Additional security information can include a more complex security code, hopping patterns and durations and other security arrangements.

A significant aspect of the invention is the ability to remotely exchange initial security related data, wherein the handset is not in physical contact with the base unit while minimizing the risk of reception by a third party.

Another aspect of the invention is that the initial security code can be rather short, particularly when it is utilized in a method wherein more complex security information and arrangements are later transmitted over the rf link. Keeping the initial security code simple minimizes the length of the sound transmission. The robustness of the security system is a significant improvement over prior art systems because the initial security code is transmitted in a way that is not easily detectable by third parties.

Although specific implementations and operation of the invention have been described above with reference to specific embodiments, the invention may be embodied in other forms without departing from the spirit or central characteristics of the invention. The described embodiments are to be considered in all respects only as illustrative and not restrictive. The scope of the invention is indicated by the appended claims rather than by the foregoing description. All changes which come within the meaning of equivalency of the claims are to be embraced within their scope.

What is claimed is:

1. A method of generating a secure wireless link between a handset unit and a base station unit, the method comprising:

transmitting a wireless initialization signal from a first handset unit to a base station unit generating a security code;

transmitting the security code from a sound transmitter at the base station unit in response to the initialization signal;

receiving the security code at a sound receiver at a second handset unit which is to be initialized, wherein the second handset unit is remote from the base station unit; and establishing an rf link between the second handset unit and the base station unit utilizing the security code.

2. The method of claim 1 wherein said generating step is initiated upon applying power to the system.

3. The method of claim 1 further comprising transmitting additional security information over the established rf link utilizing the security code.

4. The method of claim 1 wherein the step of generating the security code further comprises generating a pseudo random number.

5. The method of claim 1 wherein the step of generating the security code comprises selecting an entry from a table.

6. A cordless telephone system capable of generating a secure wireless link between a handset unit and a base station unit, the system comprising:

a first handset unit including means for transmitting a wireless initialization signal to a base station unit;

a base station unit including a sound transmitter, means for generating a security code and means for transmitting the security code from the sound transmitter in response to the initialization signal; and a second handset unit including a sound receiver, means for receiving the security code at the sound receiver at the second handset unit which is to be initialized when the second handset unit is remote from the base station unit, and means for establishing an rf link between the second handset unit and the base station unit utilizing the security code.

7. The system of claim 6 wherein said base station unit further comprises means for transmitting additional security information over the established rf link utilizing the security code.

8. The system of claim 6 wherein said means for generating a security code is configured to generate a pseudo random number.

9. The system of claim 6 wherein the means for generating a security code comprises a code generation circuit.

* * * * *